June 2, 1942.   J. G. HEASLET   2,284,821
IDLER WHEEL ADJUSTMENT MEANS
Filed Sept. 30, 1940   3 Sheets-Sheet 1
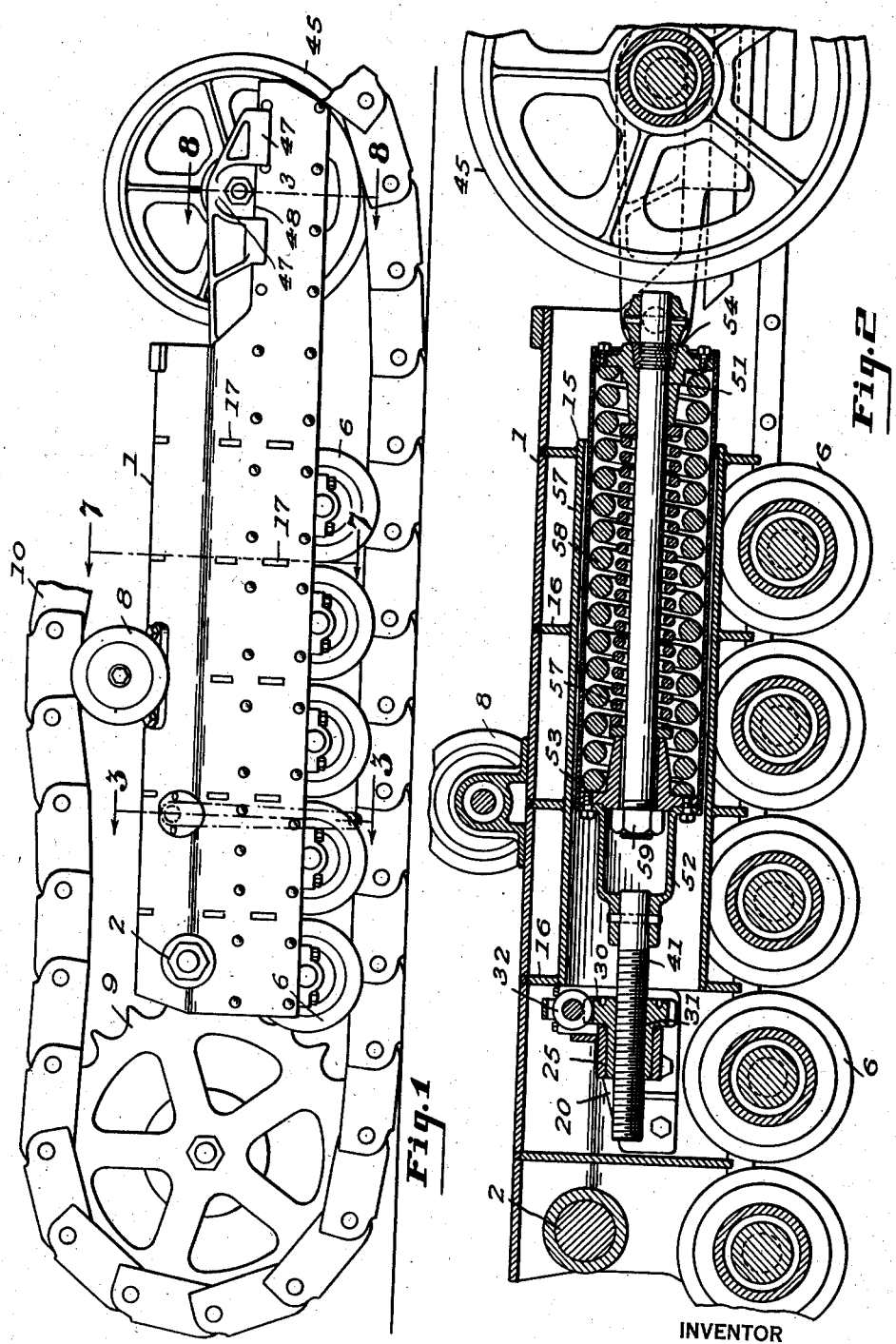
INVENTOR
James G. Heaslet
BY George Douglas Jones
ATTORNEY June 2, 1942.   J. G. HEASLET   2,284,821
IDLER WHEEL ADJUSTMENT MEANS
Filed Sept. 30, 1940   3 Sheets-Sheet 2

INVENTOR
James G. Heaslet
BY George Douglas Jones
ATTORNEY

INVENTOR
James G. Heaslet
BY George Douglas Jones
ATTORNEY

Patented June 2, 1942

2,284,821

UNITED STATES PATENT OFFICE 2,284,821

IDLER WHEEL ADJUSTMENT MEANS

James G. Heaslet, Hudson, Ohio, assignor to The Cleveland Tractor Company, Cleveland, Ohio Application September 30, 1940, Serial No. 359,125

2 Claims. (Cl. 305—9)

This invention relates to crawler type tractors and, more particularly, to a mechanism for adjusting the relative position of the front idler wheels over which the track chains pass when power is applied to the rear drive sprockets.

In tractors of the type utilizing endless driven chains, it is customary to provide offset pivoted frames on either side of the tractor chassis with front idler wheels mounted at the forward end of the side frames. Power driven sprocket wheels are positioned at the rear sides of the chassis directly behind the pivoted side frames with articulated chains composed of linked shoes encircling the idlers, frames and sprockets. A series of rollers are bearinged in the lower edge of the side frames for supporting the weight of the tractor on the lower run of the track chains, while one or more similar rollers on the top edge prevent the chains from sagging.

From this description of the drive mechanism, it will be apparent to those skilled in the art that it is essential that the chains be kept in taut adjustment to insure that the full torque of the power plant is applied to the chains at all times.

It has been proposed to mount the front idler wheels on movable bearings, to secure them to springs and the like, and in other ways to compensate for wear and stretch of the chains. However, these prior devices have only been partially successful and it is, therefore, the prime object of the invention to construct the tractor side frames and idler wheel mountings in such a manner that the wheels may be readily adjusted to keep the desired tension on the chains and also to resiliently support the idler wheels so that they may withstand the shock of starting and stopping the chains and the stresses involved when obstacles are encountered.

In the drawings,

Fig. 1 is a partial side elevation of a side frame assembly and track chain of a crawler type tractor;

Fig. 2 is a vertical longitudinal section through the forward portion of the side frame, showing the idler wheel adjustment means and support;

Figure 3:
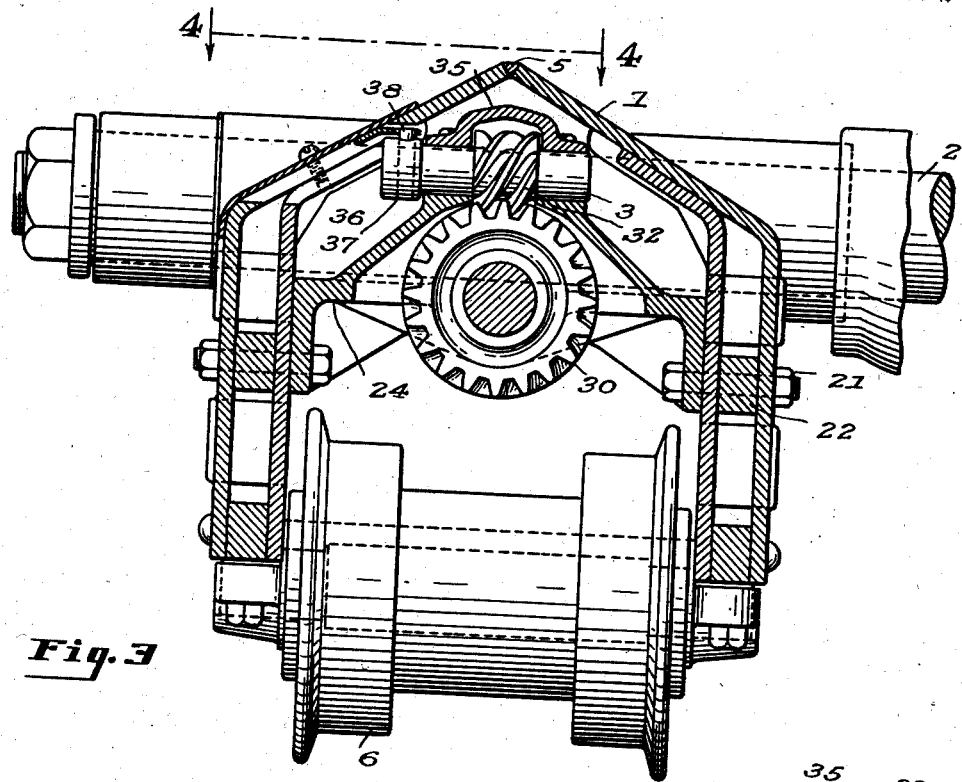
Fig. 3 is a vertical section taken on line 3—3 of Fig. 1.
Figure 4:
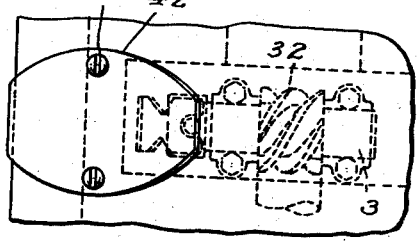
Fig. 4 is a plan view partly in a detail of the adjusting means.
Figure 7:
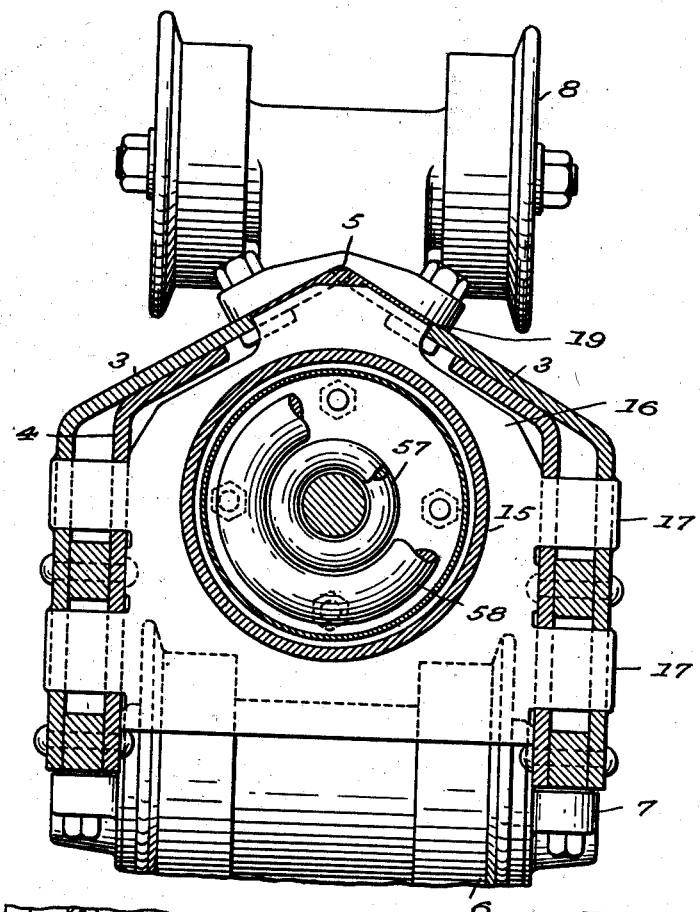
Fig. 7 is a vertical section taken on line 7—7 of Fig. 1.
Figure 8:
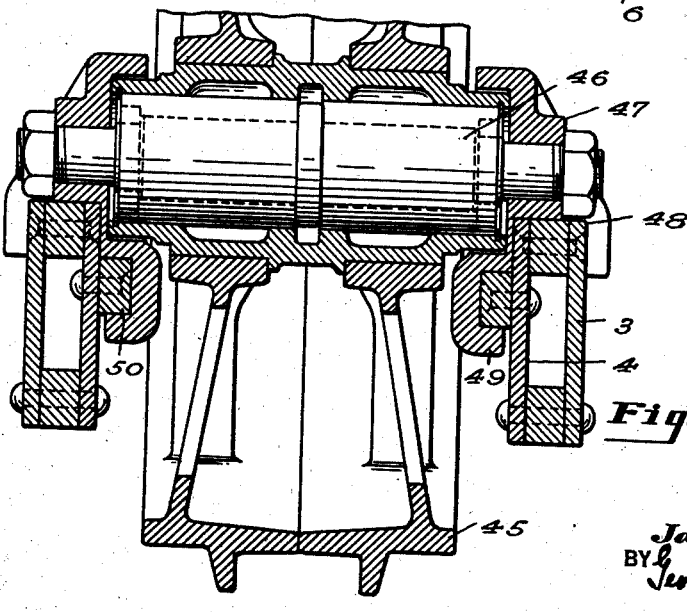
Fig. 8 is a partial vertical section taken on line 8—8 of Fig. 1.

The general layout of the crawler type tractor side frame, including the present improvement for mounting and adjusting the front idler wheel, is shown in Fig. 1. In this view, the numeral 1 denotes an open bottom tubular side frame, pivotally mounted on laterally extending shaft 2 secured to the tractor chassis frame. The side frame 1 is preferably fabricated from a pair of plates 3—3, reinforced by additional interior plates 4—4, which are spaced from the depending sides of outer plates 3—3. These series of plates are welded together in spaced relation, as shown in Figs. 3 and 7, with the upper meeting edges of plates 3—3 joined at 5. A plurality of rollers 6—6 are journalled in bearings 7—7 along the lower edges of the side frame plates 3 and 4 for the purpose of supporting the weight of the tractor on the lower run of the articulated chain 10. A top roller 8 is mounted on the upper part of the frame 3 to support the upper flight of the chain which is driven by rear sprocket wheel 9.

Within the confines of the inner plates 4—4, there is mounted a longitudinal cylinder 15 which is rigidly secured thereto by a plurality of radial or transverse plates 16. These plates 16 are welded to the cylinder 15 and are provided with pairs of spaced laterally extending ears 17 that pass outwardly through registering openings 18 formed in the spaced parallel side plates 3 and 4. The upper parts of the plates 16 are cut away and fitted in slots 19 formed on the inner sides of the apex 5 of plates 3—3. These two forms of fastenings insure the rigidity of the cylinder.

Immediately behind the cylinder there is mounted a bracket 20 that is bolted to the side plates 3 and 4 by bolts 21, which pass through the plates and spacer 22. The bracket 20 carries an arch member 23 joining the side portions 24 and also a longitudinal cylindrical sleeve or bushing 25 that is aligned with the center of the cylinder 15. An internally threaded gear 30, having an integral offset flange 31 is carried in the bushing 25 and meshes with a worm 32 having extension shafts 33. The extensions 33 are set in bearings 34 formed in the upper part of the arch member 23 and are secured therein by a complementary cap 35 bolted to the arch.

Figure 6:
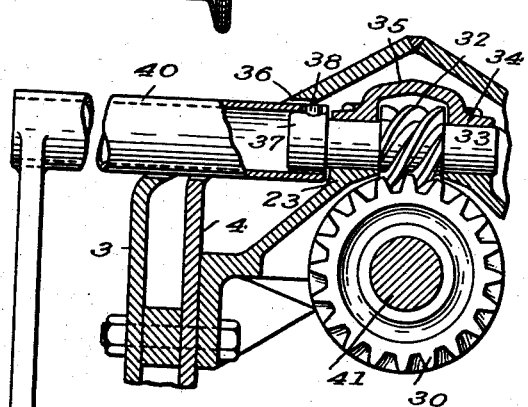
Fig. 6 is a partial vertical section taken on line 3—3 of Fig. 1 showing the placement of the adjusting crank.
Figure 5:
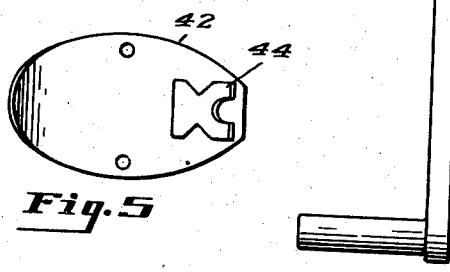
Fig. 5 is a bottom plan of the removable cover through which adjustment is secured.

As shown in Figs. 2, 3, and 6, registering openings 36 are cut through the outer side plates 3 and 4 adjacent the outer end of the worm gear 32. This extension of the shaft 33 is equipped with an enlarged end portion 37 through which a pin 38 extends. Movement is imparted to the worm 32 by means of crank 40, which may be inserted through openings 36, and encompasses the collar 37 to engage the pin 38. Rotation of the crank turns the worm and meshes gear 30 to feed the screw 41 either forward or rearward.

The outer opening 36 is normally closed by means of a cover plate 42 and held in position by machine screws 43, while the underside of the cover plate is provided with a bifurcated prong 44 that is adapted to engage the shaft pin 38 and prevent movement thereof.

Referring now to the front idler wheel 45, it will be seen that it is mounted on an axle 46 whose ends are bolted through the sides of a sliding yoke 47 that rides on the top surfaces of the reduced height forward portion 48 of the side frames. The lower edges 49 of the yoke engage bars 50 to hold the idler wheel assembly in place.

At the rear of the yoke 47, the arms thereof are brought together and fastened to a long bolt 51 which extends rearwardly into the cylinder 15 and terminates within a fitting 52 that is fastened to the screw 41. The fitting 52 is flanged and bolted to a collar 53 encircling the nut end of bolt 51. A similar collar 54 is fitted on the opposite end of the bolt and rests against the yoke and bolt fastening. Two coiled springs are concentrically arranged around the bolt 51, the inner spring 57 being tensioned between the inner ends of the collars 53 and 54, while the larger and strong spring 58 is precompressed between the flange portions of the collars. Adjustment of the proper degree of compression is secured by rotation of the nut 59 on bolt 51. This arrangement allows a certain amount of shock absorption to take place when the chains strike an obstacle and when applying power to the chassis without being transmitted to the tractor chassis.

As wear occurs to the articulated chain or when relative looseness or tightness is desired, the front idler may be accurately and easily adjusted by removing the cover plate 42 and engaging the worm 33 by the crank 40. Operation of the crank 40 allows the operator to move the idler wheel assembly either backward or forward to secure the precise adjustment needed for the particular work involved. After adjustment, the replacing of the cover cap 42 and yoke 44 locks the parts in position and prevents them from moving.

What I claim is:

1. A side frame for crawler tractors comprising an elongated open bottom, box-like member whose sides are reduced in height and extend beyond the box-like portion, a slidable carrier adapted to ride on the said extended sides, an axle secured to said carrier, an idler wheel thereon, and means carried interiorly of said box-like member for adjusting the relative position of said carrier on said extended sides, said means including a rearwardly extending shock-absorbing spring device fastened to said carrier, a screw-threaded bar fastened to the opposite end of said spring device, said bar being threaded through a gear having an internally threaded hub and a worm gear mounted at right angles to and meshing with said gear, said worm gear being adapted to be rotated to move said carrier by a hand crank inserted through an opening in said box-like member, said opening having a cover plate provided with a prong on its underside to engage said worm and prevent its rotation when said cover plate is in closed position.

2. A side frame construction for crawler type tractors comprising an elongated open bottom hollow member pivotally secured to the frame of the tractor, weight supporting rollers mounted on the lower edges of said hollow member, and a chain supporting roller on the top of said hollow member, said hollow member having its forward portion reduced in height to provide spaced guides for an idler wheel bearinged in a sliding carrier and mounted on said forward reduced portion, a longitudinal cylinder secured within said elongated hollow member, said cylinder having a plurality of radial flanges fastened to the interior walls of said hollow member, a bracket secured to the side walls of the hollow member adjacent the rear end of said cylinder, said bracket carrying a longitudinal internally threaded bushing having a transverse external gear on one end thereof, a worm gear bearinged in said bracket and meshing with said external gear, a rod threaded through said bushing and extending into said cylinder, and an intermediate spring device secured to said rod and said sliding carrier, the intermediate spring device lying substantially within said cylinder, said carrier being movable upon rotation of said worm gear.

JAMES G. HEASLET.